United States Patent [19]
Valyi

[11] Patent Number: 5,837,170
[45] Date of Patent: Nov. 17, 1998

[54] PROCESS FOR OBTAINING BLOW MOLDED PLASTIC CONTAINERS

[75] Inventor: Emery I. Valyi, Katonah, N.Y.

[73] Assignee: PepsiCo, Inc., Purchase, N.Y.

[21] Appl. No.: 771,234

[22] Filed: Dec. 20, 1996

[51] Int. Cl.⁶ ..................................................... B29C 49/78
[52] U.S. Cl. ........................ 264/40.1; 264/524; 264/532; 264/537; 215/6
[58] Field of Search ................................... 264/40.1, 523, 264/524, 532, 537; 215/6

[56] References Cited

U.S. PATENT DOCUMENTS

| | | | |
|---|---|---|---|
| 3,397,724 | 8/1968 | Bolen et al. | 264/40.1 |
| 4,065,536 | 12/1977 | Lucas | 215/6 |
| 5,232,108 | 8/1993 | Nakamura | 215/6 |
| 5,234,126 | 8/1993 | Jonas et al. | 215/373 |
| 5,242,066 | 9/1993 | Kelsey | 215/6 |
| 5,398,828 | 3/1995 | Valyi | 215/6 |

OTHER PUBLICATIONS

Nutter, "Comparing Actual Injection Blowmolded Parts to Computer Generated Injection Blowmolded Parts", Antec '94 Conference Proceedings, pp. 3544–3547, May 1994.
Haynes et al., "Predictive Structural Analysis for plastic Bottles", 11th Annual High Performance Blow Molding Conf.:Tech. Innov. in Blow Molding. Retec proceedings, pp. 1–13, Oct. 1995.

Primary Examiner—Catherine Timm
Attorney, Agent, or Firm—Bachman & LaPointe, P.C.

[57] ABSTRACT

A blow molded plastic container and process for obtaining same including a supporting member in the hollow space of the container extending completely across the hollow space and integral with the inside wall face of the body portion of the container at two spaced locations thereof to support the inside wall face. The shape of the container is altered at areas of stress concentration so as to reduce stress at areas of stress concentration and thereby avoid excessive deformation at said areas.

7 Claims, 3 Drawing Sheets

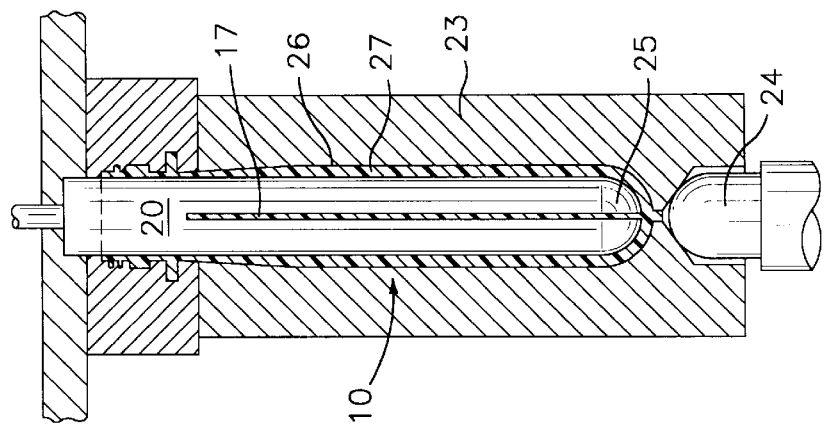
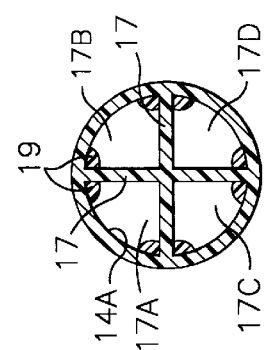
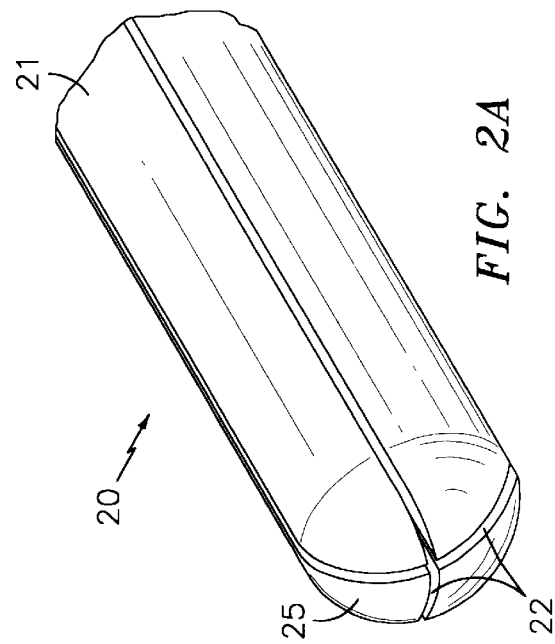
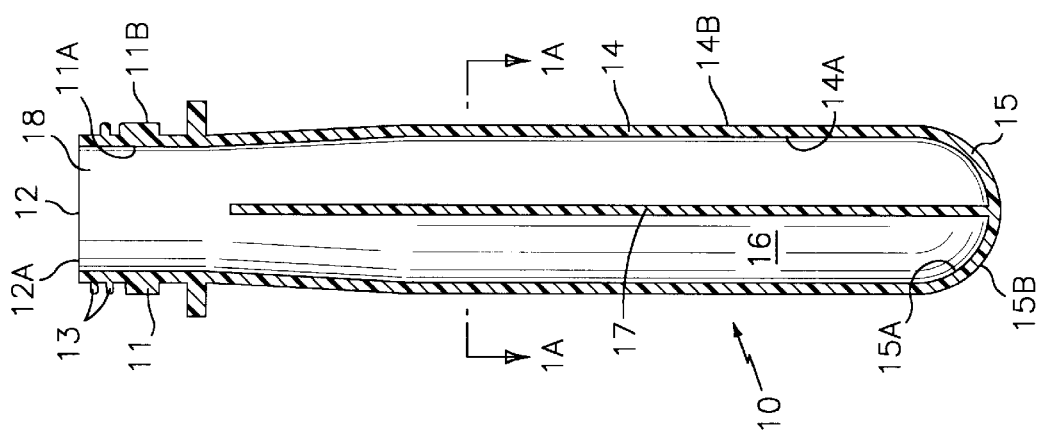

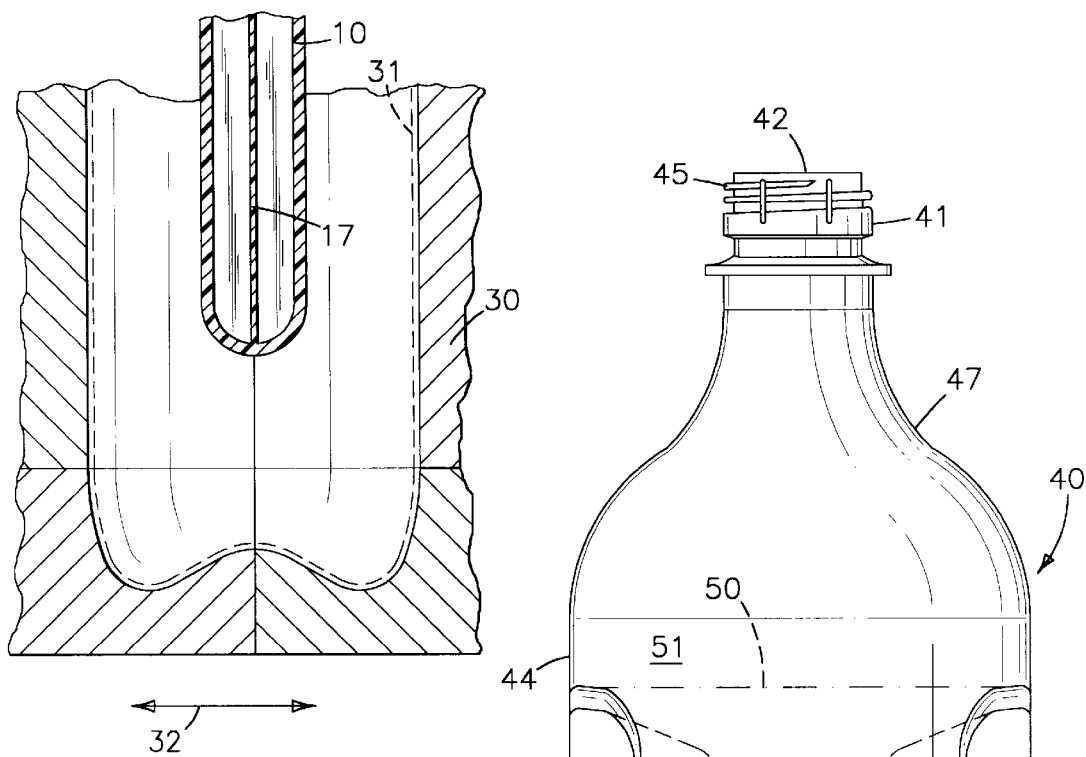
FIG. 3
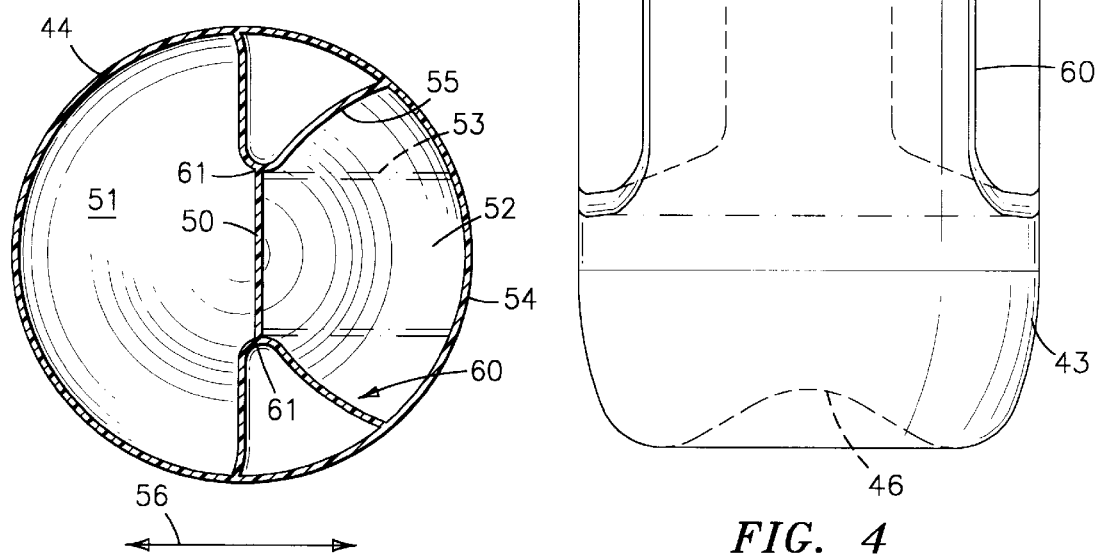
FIG. 5
FIG. 4

PROCESS FOR OBTAINING BLOW MOLDED PLASTIC CONTAINERS

BACKGROUND OF THE INVENTION

The present invention relates to plastic containers especially for retention of fluids under pressure, as for carbonated beverages or the like, and to the manufacture thereof. These containers are usually prepared from a preform which may be injection or extrusion molded, followed by blow molding the preform into a suitably shaped container using a blow mold having the desired shape. Typical thermoplastic materials are polyethylene terephthalate (PET), polyolefins, etc., although others can be used.

The container configuration generally includes a neck portion with a cap retaining means, a shoulder portion depending therefrom, a side wall or main body portion depending from the shoulder portion and a bottom portion joined to the side wall and depending therefrom.

For the convenience and economy they represent, the public calls for large size containers, as for example, the two liter PET bottles widely used for carbonated beverages and one gallon milk bottles. Indeed, even larger containers would be desirable. However, these containers, when used for carbonated beverages, lose substantial amounts of the $CO_2$ that is preferably dissolved therein. This loss occurs as the container is repeatedly opened, which is usual for a container whose volume exceeds the amount of beverage that is normally consumed upon a single opening. The respective loss of $CO_2$ is termed the head-space loss, "head-space" being the volume of the container not filled with beverage, into which $CO_2$ may escape from the beverage, and which increases as the contained beverage volume decreases with repeated consumption from the same container.

Head-space loss is the reason for limiting the size of carbonated beverage bottles generally to 2 liters, the 3-liter size being often used in cases of unusually rapid consumption, as during a group outing.

In addition, large containers, e.g., bottles containing 1 ½ liters or more are awkward to manipulate by people with small hands, particularly children, and therefore require means to handle them more conveniently than having to grasp them with two hands, as for pouring.

Both drawbacks of such large containers may be remedied, alone or in combination, by providing integral inner walls within same. For large bottles, such inner walls may be used to subdivide them into several compartments, with corresponding arrangements to open one compartment at a time for consumption from one compartment at a time. Naturally, to effect such successive consumption, the bottle must be provided with a selective closure. Examples of compartmented containers are shown in U.S. Pat. No. 5,232,108 to Y. Nakamura.

To improve handling large containers, an integrally reinforced handgrip may be constructed, that is, kept from everting due to the internal pressure in the container by an inner wall member attached inside to the container wall at the indentations that form the said handgrip, as described in U.S. Pat. No. 5,398,828.

Accordingly, an integral inner wall may be employed for both purposes, once to subdivide the container, another to preclude eversion of depressions in the outer wall of the container.

The purpose of this invention is to provide an economical and aesthetically pleasing bottle made of PET, or other plastics exhibiting comparable molding characteristics, such as polycarbonate, polystyrene, etc., which bottle may have several compartments and/or a grip as part of its side-wall that will deform in a predetermined fashion under internal pressure, but not evert, if a grip is used.

In the past, it was attempted to accomplish this purpose by providing a preform, as for example according to the above cited U.S. Pat. No. 5,232,108 and blow molding it in a mold whose molding cavity corresponded to the dimensions of the desired finished container. The disadvantage of this is due to the pattern of deformation the as-blow molded container exhibits due to internal pressure produced by a carbonated beverage if said container is unable to deform in a geometrically similar manner due to the constraint imposed by an inner wall. If said deformation is excessive, the appearance of the filled and pressurized bottle becomes unacceptable to the consumer wishing to purchase the beverage. In the case of a bottle with the handgrip referred to above, said handgrip may deform enough to impede its usefulness.

These defects may in principle be remedied by increasing the rigidity of the container, as molded. This is accomplished by increasing the wall thicknesses, as necessary, and therewith the amount of plastic used to make the containers, resulting in undesirable expense. In the case of crystalline plastics, such as polyethylene terephthalate (PET), polycarbonate (PC) and nylons, the increased wall thickness results in structurally undesirable morphology.

Accordingly, it is a principal object of the present invention to provide a blow molded plastic container and process for obtaining same for pressurized contents, particularly for carbonated beverages having an improved configuration and/or a size above that currently available.

It is a still further object of the present invention to provide a container and process as aforesaid without producing undesirable morphologies and without undue increase in the cost of the plastic used in making it.

It is a still further object of the present invention to provide a container and process as aforesaid wherein a handgrip portion, if included, retains its efficacy when the container is filled under pressure, as with a carbonated beverage.

It is a further object of the present invention to provide a method for producing a container with internal compartments produced by support walls and with provisions to predetermine the final shape of the container when under internal pressure.

Further objects and advantages of the present invention will appear hereinbelow.

SUMMARY OF THE INVENTION

In accordance with the present invention, the foregoing objects and advantages may be readily obtained.

The present invention provides an improved method for molding a blow molded plastic container for pressurized liquids having an internal member, with the container having an external wall with an inner and outer surface and with the internal member joined to the inner surface of the external wall at areas of intersect therebetween, and wherein the shape of the container, as molded, differs from that of the pressurized container and is predictably changed into the shape of the latter upon pressurizing.

The present invention also provides an improved process for forming a blow molded plastic container for carbonated beverages, which comprises providing a first blow molded plastic precursor container having an external wall with an inner and outer surface thereof and with an internal wall member therein joined to the inner surface of the external wall, determining the stress-strain characteristics thereof, further determining the shape thereof upon pressurizing, computing based upon said characteristics and determination the shape of a similar precursor container that will deform under pressure into the desired shape of the pressurized container, preparing said similar precursor, and subjecting said similar precursor to a specified internal pressure to produce a second container having a predetermined shape.

The container of the present invention provides numerous advantages. It is a blow molded compartmented plastic container with at least one inside wall which may also include supported handgrips, which obtains its efficacy and desired final shape when the container is filled under pressure, as with carbonated beverages. The container of the present invention is convenient and easy to prepare by commercial methods, and mitigates the problem of undesired deformation without increasing the weight of the containers unduly.

In accordance with the present invention, there is provided a process for forming a blow molded plastic container for carbonated beverages, which comprises providing a blow-molded plastic precursor having a shape and wall thickness and including an external wall with an inner and outer surface thereof and an internal wall member therein joined to the inner surface of the external wall, determining the mechanical properties in several chosen locations and the stress distribution in the precursor due to internal pressure in the vicinity of said locations, preparing an altered precursor by altering at least one of the wall thickness and shape of said precursor so as to obtain a desired pattern of deformations due to stresses resulting from the application of internal pressure, thereby providing a desired blow molded plastic container. Desirably also said alteration step reduces stress concentration so as to be within specified limits.

Further advantages of the present invention will appear hereinbelow.

BRIEF DESCRIPTION OF THE DRAWINGS

The foregoing will be more readily apparent when considered in connection with the following illustrative drawings wherein:

FIG. 1 is a side-sectional view of a preform for preparing a container of the present invention;

FIG. 1A is a sectional view taken along lines 1A—1A of FIG. 1;

FIG. 2A is a partial perspective view of a core for forming the preform of FIG. 1;

FIG. 2B is a sectional view of a core-injection mold assembly for forming the preform of FIG. 1;

FIG. 3 is a partial sectional view taken through a blow mold for forming a container of the present invention from a preform similar to the preform of FIG. 1;

FIG. 4 is an elevational view of a container of the present invention;

FIG. 5 is a cross-section view of the container of FIG. 4 taken along lines 5—5 of FIG. 4 showing the precursor of the container in the unfilled condition as well as the container filled with carbonated beverage;

DETAILED DESCRIPTION OF PREFERRED EMBODIMENTS

Figure 6:
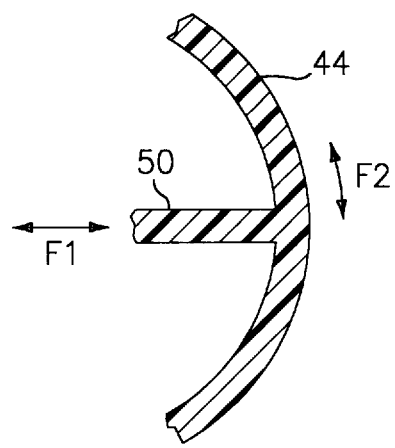
FIG. 6 is a partial cross-section view of the intersect of the inner and outer wall of the container under internal pressure.

In accordance with the present invention, the container of the present invention exhibits internal walls to form compartments and/or depressions and lobes between the depressions that serve to facilitate gripping the bottle.

The preform for forming these containers may be prepared by pressure molding and includes at least one internal wall extending completely across the inside of the preform in the location which will correspond to that of the internal supporting member in the final blow molded and pressurized container.

Referring to FIG. 1, a plastic parison or preform 10 is formed by pressure molding from a synthetic resin which desirably can be biaxially oriented as for example polyethylene terephthalate. The preform 10 has a neck portion 11 defining an opening 12 and it may be provided with external threads 13 to serve as the site for attachment of a cap or closure means on the finished, blow molded plastic container, as for example a closure adapted for selective opening. The preform 10 has a body portion 14 depending from the neck portion 11 and an integral bottom portion 15 depending from the body portion. The body portion in FIG. 1 is generally tubular, although one can of course deviate from a tubular structure. Neck portion 11 has an inside wall face 11A and an outside wall face 11B, tubular body portion 14 has an inside wall face 14A and an outside wall face 14B, and bottom portion 15 has an inside wall face 15A and an outside wall face 15B. Body portion 14 defines hollow space 16 within preform 10, wherein the hollow space 16 is closed at the bottom portion 15 and open at neck opening 12. Bottom portion 15 may have any desired or convenient shape depending upon the desired final container characteristics, such as for example the rounded semicircular shape shown in FIG. 1, a flat or slightly inwardly directed bottom shape, or several feet.

Preform 10 includes at least one and possibly two or more internal walls 17, such as the two walls shown in FIG. 1A. The internal walls 17 extend completely across hollow space 16 and from the bottom portion 15, into tubular body portion 14 preferably ending within body portion 14, but if desired extending into the neck portion or to the rim. As shown in FIG. 1A, four separate chambers 17A, 17B, 17C and 17D are formed by internal walls 17, although of course the chambers communicate with each other above wall 17. Alternatively, internal walls 17 may be limited to that region of preform 10 that will subsequently form a handgrip as in U.S. Pat. No. 5,398,828. As can be clearly seen in FIGS. 1 and 1A, the internal walls 17 are attached to inside wall face 14A. The preform may be made of transparent PET so that the internal walls are readily visible.

The method of forming preform 10 by injection molding is shown in FIGS. 2A and 2B whereby injection molding core 20 includes external wall 21 in a generally cylindrical shape and including slots 22 corresponding to the desired internal partition walls in the preform. Thus, core 20 is placed in injection mold 23 in the conventional manner in alignment with injection nozzle 24 seated in injection mold 23 adjacent the bottom 25 of injection core 20. Core 20 is seated in injection mold 23 so that a space 26 appears between core 20 and injection mold 23 and molten plastic 27 is injected to fill space 26 via injection nozzle 24. Molten plastic 27 will also travel into slots 22 in the core 20 to form the internal walls 17. Alternatively, the internal walls may if desired by separately formed and subsequently adhered to the inside wall of the preform or precursor. The injection mold and core assembly is then opened, and the preform 10 removed in the conventional manner.

While at a temperature appropriate for blow molding, the warm preform 10 is then placed in a blow mold 30 as shown in FIG. 3 and a hollow article to serve as a precursor of the container of the present invention is formed therefrom by blow molding or stretch blow molding, the example hereshown being that of a bottle with a handgrip.

The warm preform is placed in a blow mold having the configuration of the precursor of the desired container, as blow mold 30 in FIG. 3, while blowing compressed air thereinto so that the preform expands into shape 31 corresponding to said precursor, as shown in dashed lines in FIG. 3, to effect axial and circumferential elongation. This procedure may be carried out with or without a stretch rod or mandrel to effect axial extension. If such a rod is used, it should have as many prongs as there are preform chambers, with each bearing against the preform bottom within each chamber. The walls 17 will expand to the extent permitted by blow mold 30. The particular blow mold shown in FIG. 3 has an internal configuration which allows the formation of a hollow plastic article being the precursor of container 40 shown in FIG. 4, a cross-section of the lobes of said precursor being shown in FIG. 5 in dotted lines. Mold 30 includes at least two adjoining lobes connected together by depressions, not shown in the section according to FIG. 3 but clearly shown in FIG. 5.

In accordance with conventional procedure, mold 30 is parted as indicated by arrow 32 in FIG. 3 to release the blown precursor container.

As can be seen from FIG. 5, the circumference of the precursor is greater than that of a circle circumscribing same. The wall 14 of preform 10 in FIG. 1 is stretched accordingly to a greater extent at the regions that form the depressions of the handgrip than at other regions thereof. In a preferred embodiment, the preform walls are provided with thickenings 19 at the intersections of walls 17 and 14 as shown in FIG. 1A. The thickenings are juxtaposed said depressions during blow molding and thereby minimize stress concentration that would occur in the absence of the thickenings. Thickened regions may also be juxtaposed the portions of the blow mold in which the indentations are formed to preclude excessive thinning thereof.

Thus, blow molded, plastic container 40 is formed having a neck portion 41 defining an opening 42, a bottom portion 43, a body portion 44 interconnecting the neck portion 41 and the bottom portion 43. Neck portion 41 is provided with external threads 45 corresponding to threads 13 on preform 10 for attachment of a closure. Bottom portion 43 may have an axially, inwardly directed generally conical base 46. Container 40 also includes shoulder portion 47 connecting neck portion 41 and tubular body portion 44.

Container 40 is provided with at least one internal wall 50 which corresponds to the internal wall 17 of preform 10 and which extends completely across hollow space 51 within container 40 and may extend from the bottom portion 43 to the body portion 44 and may extend all the way to the neck to form a compartmented container. The internal wall or walls may be limited to the handgrip portion.

As can be readily seen from FIGS. 3 and 5, the internal walls are integral with the container. The internal walls or walls may extend all the way to the bottom of the container as shown in FIG. 3 or may start and end in the body portion as shown in FIG. 4 or extend all the way to the neck region or opening.

Referring to FIG. 5, body portion 44 contains adjoining arcuate lobes 60 connected together by depressed regions or depressions 61, particularly suitable for a handgrip in a large sized container. Naturally, alternate shapes can be provided. Supporting members 50 in hollow space 51 connect the depressions to maintain their spacing and to provide support therefor to avoid everting. As can be seen from FIG. 4, the internal wall may end within the body portion near the end of the handgrip. As shown in a representative embodiment of FIG. 4, wherein container 40 has discrete handgrips formed by depressions 61 and lobes 60. Supporting member 50 is provided adjacent and supporting the depressions as discussed above, which may extend all the way to the bottom portion or may extend well into the shoulder. portion.

FIGS. 4 and 5 show an embodiment of the container 40 of the present invention, preferred for containers with a handgrip. FIG. 5 shows precursor lobe 52, as produced in the blow mold, see FIG. 5 where the boundary of precursor lobe 52 is shown in dashed lines, with internal supporting member 50 connecting two adjoining indentations or depressions 61 at the base thereof to preclude spreading of the lobe at the location of the junction between supporting member 50 and indentations 61. In the precursor of container 40, precursor lobe 52 includes the inner wall and segments 53, which may have substantially straight walls or a slight outward taper, as shown in dashed lines, joined together by arcuate segment 54, whereby segments 53 are deformed into the arcuate segments 55 which are desired to define the boundary of smaller lobe 60 when the precursor container is pressurized, e.g., by being filled with carbonated beverage. For compartmented bottles without handgrip lobes, analogous problems arise, in that the pressurized, compartmented bottle deforms under constraint of the inner walls into arcuate lobes between said walls, rather than a substantially round crosssection, which is desired that the pressurized bottle exhibit.

It is a principal objective of the present invention to design a precursor of a final container so that the precursor may be converted into the desired final container by the step of pressurizing as described hereinabove, with the pressure necessary for said conversion having the desired effect of imparting the desired shape appearance and properties of the finished container.

Thus, in accordance with the present invention the mechanical properties of the material used, e.g., polyethylene terephthalate (PET) particularly the relationship of tensile stress to deformation under varying conditions of time, temperature and other environmental exposure, are measured location-by-location in the several parts of a model precursor closely resembling the desired precursor as to size and shape, by static and creep tests at several ambient temperatures.

To know the average properties, as obtained from literature, is not sufficient for this purpose. The significant properties of a blown container differ from shape to shape and size to size. They depend on the design of the preform from which it is made, and the preform's temperature profile and other variables during its processing. Thus, the response to stress and the corresponding deformation at locations that are critical during conversion of the precursor to the final container by internal pressure depends on corresponding stress-strain relations, by specific location.

In particular, the stress-strain correspondence must be defined under static (burst) and creep conditions, taking into account the ambient exposure to which the finished container may be subject.

Taking a reasonably estimated precursor geometry as a starting point, the pattern of deformation is under internal pressure as measured in a model precursor. The data so obtained is used in a computer modeling procedure known as finite element analysis (FEA) to derive that geometry of the precursor which the FEA predicts to that of the desired finished container, given the stress-strain information determined, as above. As the shape of the latter evolves in the FEA and reaches its desired final dimensions, the corresponding stress distribution is also observed. For all of this to be accomplished, the dimensional data of the estimated precursor and model of the desired container are provided to the FEA program, taking the properties of the precursor and the stress-strain relation into account, location by location. For example, the properties of inner wall 50 differ significantly from the properties of outer wall 44, as do the properties at the intersect of these walls from those remote from the intersect.

The same applies to the intersect of wall 50 with the bottom wall shown in FIG. 4, and also to other locations in which a significant transition of wall thickness occurs, as given by the geometry of the precursor and the desired finished container.

The computational program known as FEA is known to be used in the design of structures subject to stress, including vessels under internal pressure, including bottles, mostly to predict performance in service, including failure analysis. In effect, FEA represents linearization of the known equation systems that relate deformation and stress in specific structures using the moduli characteristic of the material of which said structures are made, e.g., Young's modulus, Poisson's ratio, creep rate and others. The FEA is typically based on values of said moduli as constants in the respective equations, determined by self-contained tests, e.g., tensile tests performed on test samples made of the same materials, but independently of any structure resembling the desired final structure and made under comparable conditions. FEA so made in the case of a complex geometry entailing substantial process determined difference in moduli is necessary and is an essential part of the product here described, and of the procedure for its preparation.

The FEA also reveals, as part of the stress distribution, the locations of stress concentrations that tend to cause deformations in excess of the limits desirable in the desired finished container, even to the extent of failure. Such concentration is found, for example, at sudden transitions of one wall thickness to another. Thus, a purpose of the present invention in addition to determining the shape correspondence between precursor and final bottle, is to examine loci of probable stress concentrations, e.g., at transition radii, and the major changes of wall thickness, so as to reduce the stresses to levels that avoid excessive strains in the desired container upon it being subjected to internal pressure.

Figure 7:
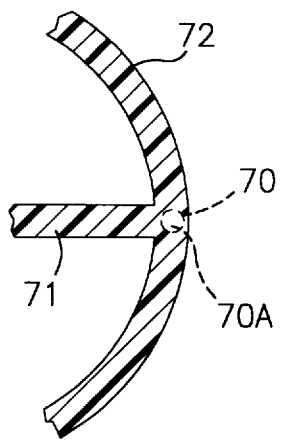
FIG. 7 is an enlarged partial cross-section view similar to FIG. 6.
Figure 8:
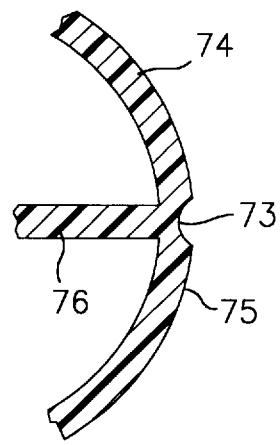
FIG. 8 is a partial cross-section view similar to FIGS. 6 and 7 showing a modification of the present invention.

FIGS. 6–8 show instances of potential stress concentrations at locations that tend to have morphological characteristics that may provide excessive stress concentrations.

FIG. 6 shows a partial cross-section view of the intersect of inner wall 50 and the outer wall 44 of container 40 under internal pressure. A spreading force F1 is exerted on the inner wall and a tangential force F2 on the outer wall. The resulting average tensile stresses correspond to these forces taken over the respective cross-sectional areas, except at the intersect. At the intersect, the stress will be a multiple of the above average stresses, its magnitude depending on several factors, an important of which is the transition radius between the two walls and the micro-structure at the intersect. The choice of that radius is also dependent on the necessary design of the preform injection mold.

FEA predicts maximum stress as a function of structure and of said radius, and the choice is then made so as to adopt the preform and the bottle molding condition to result in allowable stresses, taking the morphology of the material at the respective location into account.

FIG. 7 shows an example of a stress concentration brought about by the morphology of the precursor. Note, stresses are additive and therefore the stress due to the transition radius is superimposed on that caused by any other effect, e.g., the existing inhomogeneous morphology. FIG. 7 shows the same cross-section as in FIG. 6, it being a portion of a model precursor. It can be seen that the net cross-section and the resulting accumulation of material at intersect location 70 is greater than at locations 71 and 72. Accordingly, the crystalline structure 70A within the irregularly circumscribed region of FIG. 7, tends to be coarse-spherulitic along the length of the intersect, and act as an effective notch in the otherwise fine crystalline cross section, hence a stress concentration. Also, region 70 is differently oriented due to its bulk and consequent response to heating. It may be overstretched to the point of fissuring, and/or have mostly spheroidal crystallinity and therefore act as a notch.

Difference in stretch ratios result in different levels and kinds of crystallinity. In the present instance, the difference is enhanced by the fact that the temperature at which the two walls are deformed in blowing is not nearly the same. The properties of crystallizable plastics, such as PET, depend strongly upon the aspects of their orientation. When substantial differences in orientation are present in the same structure, as in this case, and the structure is stressed, a similar effect is seen as in the case of a discontinuity, e.g., a notch.

Specifically considering location 70 in FIG. 7, the accumulation of material, which is present in the preform and therefore also in the precursor and final container, results in considerable difference of the conditions obtained in heating the preform before blowing. Thus, the region adjoining region 70 may be expected to reach a higher temperature in the same time than the central or core portion of region 70. This in turn obviously affects the pattern of preform and precursor deformation, with potentially major differences between the corresponding parts of the precursor and/or final container. Again, a notch effect is produced.

FEA is useful in identifying the dimensional remedies to offset these notches, but only if it is based on detailed stress-strain data applicable to these critical locations.

In general, for a successful precursor, one must have ample transition radii and equalized wall thickness particularly at the intersects, and in the case of PET one must also identify differences in crystalline morphology.

FIG. 8 shows a cross-section view similar to FIGS. 6 and 7 showing one possibility of the present invention to equalize the cross-section of the precursor at the intersect in which an external groove 73 is provided on the external wall 74 outer surface 75 adjacent internal member 76 intersect with external wall 74.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for forming a blow molded plastic container for carbonated beverages, which comprises:

forming a first blow molded plastic precursor by blow molding said first precursor from a preform, said first precursor having a shape and wall thickness and including an external wall with an inner and outer surface and with an internal cavity and an internal wall member extending across the internal cavity and connecting a first portion of the inner surface to a second portion of the inner surface;

determining the relationship of tensile strength to deformation in several chosen locations and the stress distribution in the first precursor due to internal pressure in the vicinity of said locations;

computing, based on data obtained in said step of determining, the wall thickness and shape of an altered second blow molded precursor that will deform under pressure into a desired shape, said second precursor having a shape and wall thickness and including an external wall with an inner and outer surface thereof, and with an internal cavity and an internal wall member therein extending across the internal cavity and connecting a first portion of the inner surface to a second portion of the inner surface; and preparing said altered second blow molded precursor by blow molding a second preform at least one of the wall thickness and shape of said second precursor being altered in relation to said first precursor so as to obtain a desired pattern of deformation in said internal and external walls due to stresses resulting from the application of internal pressure; thereby providing a desired blow molded plastic container.

2. A process according to claim 1, wherein said alteration of at least one of the wall thickness and shape reduces stress concentration so as to be within specified limits.

3. A process according to claim 1, wherein the stress distribution under internal pressure of said precursor is determined to design a desired blow molded plastic container.

4. A process according to claim 3, including the steps of pressurizing said first precursor, and determining the stress distribution and deformation in said first precursor.

5. A process according to claim 4, wherein the stress distribution and the relationship of tensile strength to deformation are determined by finite element analysis based on the distribution of properties of the precursor.

6. A process according to claim 1, including providing a groove on the outer surface of the external wall of said second precursor adjacent the intersect of the internal member with the external wall.

7. A process according to claim 6, wherein said groove is designed to result in substantially homogeneous morphology at said intersect.

* * * * *